(12) United States Patent
Parrish (10) Patent No.: US 9,476,524 B2
(45) Date of Patent: Oct. 25, 2016

(54) SUPPORT SYSTEM BUMPER FOR EXHAUST DUCT LINER HANGER

(75) Inventor: Russell P. Parrish, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1345 days.

(21) Appl. No.: 13/586,614

(22) Filed: Aug. 15, 2012

(65) Prior Publication Data

US 2014/0230943 A1 Aug. 21, 2014

(51) Int. Cl.
- *F01D 25/28* (2006.01)
- *F02C 7/20* (2006.01)
- *F16L 3/12* (2006.01)
- *F02K 1/80* (2006.01)
- *F02K 1/82* (2006.01)

(52) U.S. Cl.
CPC ............... *F16L 3/12* (2013.01); *F01D 25/28* (2013.01); *F02K 1/80* (2013.01); *F02K 1/822* (2013.01); *F05D 2230/642* (2013.01); *F05D 2250/75* (2013.01); *F05D 2260/96* (2013.01); *F05D 2300/501* (2013.01); *Y02T 50/675* (2013.01)

(58) Field of Classification Search
CPC .. F01D 25/28; F01D 25/04; F05D 2230/642; F05D 2250/75; F02C 7/20; F05B 2230/606
USPC ........ 60/796, 799; 415/213.1, 119; 248/317, 248/610–613, 562, 554–557
See application file for complete search history.

(56) References Cited

U.S. PATENT DOCUMENTS

| | | | |
|---|---|---|---|
| 2,172,706 A * | 9/1939 | Julien | F16F 1/54 248/557 |
| 2,193,332 A * | 3/1940 | Hasbrouck | B64D 27/04 248/556 |
| 5,059,055 A | 10/1991 | DeGress et al. | |
| 5,265,409 A | 11/1993 | Smith, Jr. et al. | |
| 6,969,239 B2 * | 11/2005 | Grant | F01D 5/16 415/119 |
| 7,581,399 B2 | 9/2009 | Farah et al. | |
| 7,721,522 B2 | 5/2010 | Farah et al. | |
| 7,788,899 B2 | 9/2010 | Smith | |
| 7,854,586 B2 | 12/2010 | Major et al. | |
| 7,861,535 B2 | 1/2011 | Figueroa et al. | |
| 7,866,158 B2 | 1/2011 | Murphy | |
| 8,127,526 B2 | 3/2012 | Murphy et al. | |
| 2007/0151229 A1 * | 7/2007 | Farah | F02K 1/002 60/232 |
| 2011/0016880 A1 | 1/2011 | Roberts et al. | |

* cited by examiner

*Primary Examiner* — Thomas Denion
*Assistant Examiner* — Mickey France
(74) *Attorney, Agent, or Firm* — Kinney & Lange, P.A.

(57) ABSTRACT

A hanger for use in a gas turbine engine exhaust system comprises a first bracket, a second bracket, a pin and a bumper. The first bracket is for connecting to an exhaust duct or liner of the gas turbine exhaust system. The second bracket is for connecting to an exhaust duct or liner of the gas turbine exhaust system. The pin extends through the first and second brackets to bring the first and second brackets into pivotable engagement. The bumper is positioned adjacent the first or second bracket to inhibit movement of the first bracket relative to the second bracket.

18 Claims, 4 Drawing Sheets

SUPPORT SYSTEM BUMPER FOR EXHAUST DUCT LINER HANGER

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium-based alloys and have temperature limits of approximately 300°-600° F. (~148.9°-315.6° C.). Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately (~371.1°-815.6° C.). In order to alleviate some of the heat from the exhaust gases imparted to the liner, cooling air is passed between the exhaust duct and liner. For example, bypass air is routed between the duct and liner in turbofan engines. Thus, the exhaust duct and liner are subjected to different pressure and temperature gradients, which results in differing deflections and expansions of each body.

In order to maintain the desired temperature and pressure profile along the exhaust duct and liner, it is desirable to maintain proper spacing between the exhaust duct and liner. The differing pressures, temperatures and functional requirements of the exhaust duct, however, produce three-dimensional forces between the duct and liner, which tend to shift the liner out of alignment during different operating conditions of the engine. Various liner hanger designs have been put forth to maintain proper alignment, such as described in U.S. Pat. No. 7,866,158 and U.S. Pat. App. Pub. No. 2009/0016880, which are assigned to United Technologies Corporation. In these designs, alternating upside-down and right-side-up U-shaped brackets on the liner and exhaust duct, respectively, are connected by a rod. These liner hanger designs typically rely on pressure from the bypass cooling air to maintain the brackets in tension. The brackets, however, are inefficient in reacting compressive loading between the duct and liner. There is, therefore, a need for an exhaust duct liner suspension system that permits the liner to shift within the duct, but that also reacts both radial compressive and radial tensile loads between the duct and liner.

SUMMARY

A hanger for suspending a liner within an exhaust duct of a gas turbine engine exhaust system comprises a first bracket, a second bracket, a pin and a bumper. The first bracket is for connecting to an exhaust duct or liner of the gas turbine exhaust system. The second bracket is for connecting to an exhaust duct or liner of the gas turbine exhaust system. The pin extends through the first and second brackets to bring the first and second brackets into pivotable engagement. The bumper is positioned adjacent the first or second bracket to inhibit movement of the first bracket relative to the second bracket.

DETAILED DESCRIPTION

Figure 1:
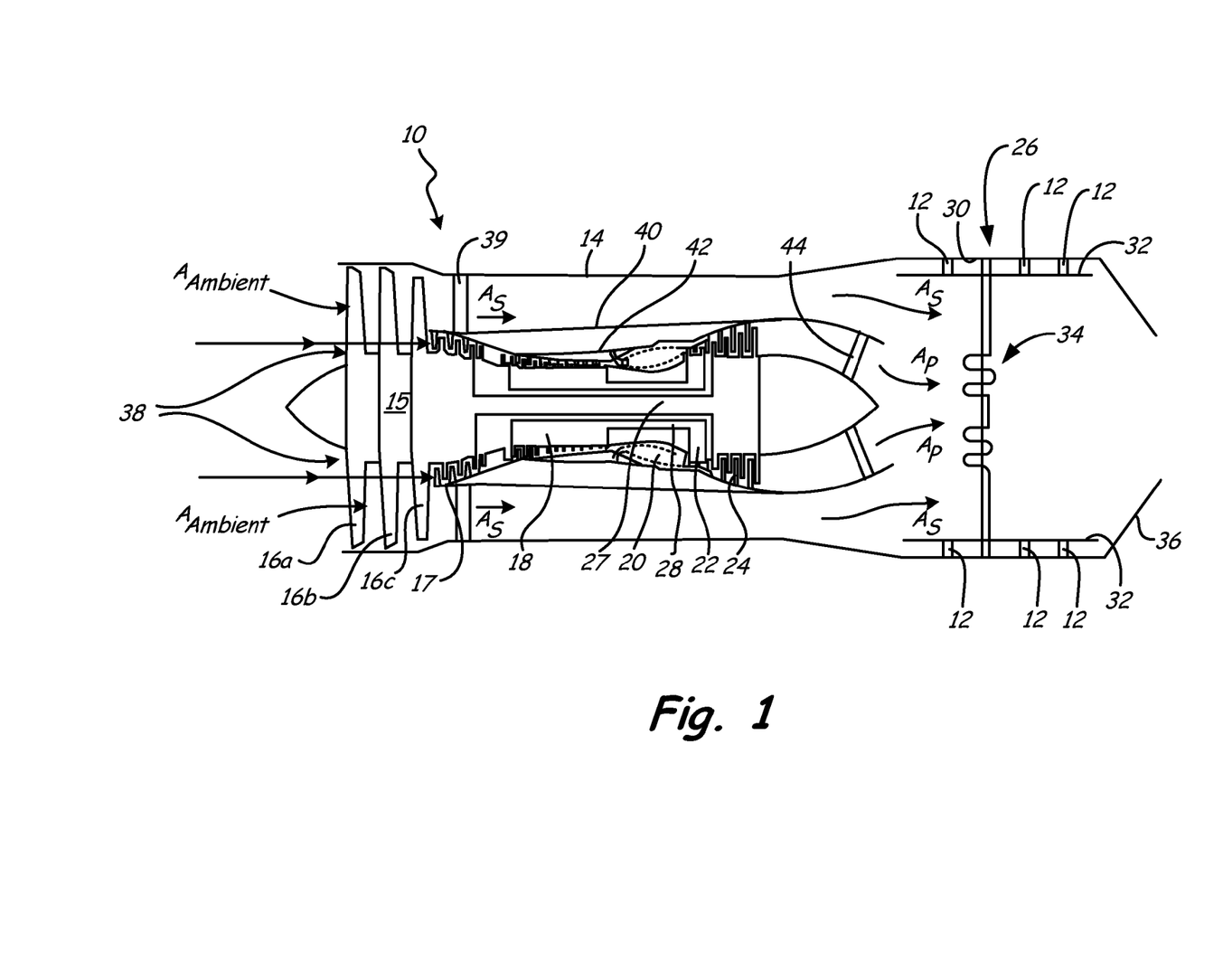
FIG. 1 is a schematic diagram of a dual-spool, low-bypass ratio turbofan engine having an exhaust duct liner supported within an exhaust duct using hangers having a two-stage bumper of the present invention.

FIG. 1 shows a schematic diagram of dual-spool, low-bypass ratio turbofan engine 10, in which hangers 12 of the present invention can be used. Although, in other embodiments, the present invention is applicable to other types of gas turbine engines such as high-bypass ratio turbofans including turbofans using fan drive gear systems. Turbofan engine 10 also includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, liner 32, augmentation system 34 and exhaust nozzle 36. Exhaust system 26 also includes hangers 12, which include two-stage bumpers of the present invention. Hangers 12 are disposed in multiple circumferential arrays to maintain liner 32 mounted within exhaust duct 30. FIG. 1 shows three, axial sequential arrays of hangers 12. However, liner 32 may be supported by many more arrays wherein the total number of hangers numbers in the hundreds. Liner 32 may be comprised of a plurality of individual panels suspended by a number of hangers 12.

Ambient air $A_{Ambient}$ enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air: primary air $A_P$ and secondary air $A_S$. Secondary air $A_S$, also known as bypass air, passes through fan exit guide vanes 39 and between fan duct 14 and aft duct 40 where it passes on to exhaust system 26. Thus, the principal function of secondary air $A_S$ is the production of thrust from drive fan 15. Secondary air $A_S$ also serves to cool exhaust duct liner 32 from primary air $A_P$. Primary air $A_P$, also known as hot air, is a stream of air that is directed first into low pressure compressor 17 and then into high pressure compressor 18 within engine case 42. Pressurized primary air $A_P$ is then passed into combustor 20 where it is mixed with a fuel supply and ignited to produce high energy gases, as is known in the art. The high energy gasses are used to turn high pressure turbine 22 and low pressure turbine 24. Turbine 22 drives compressor 18 with shaft 28, while turbine 24 drives compressor 17 and drive fan 15 with shaft 27. Primary air $A_P$ passes from engine case 42 to exhaust system 26 through exit guide vanes 44.

Mixed combusted primary air $A_P$ and bypassed secondary air $A_S$ are passed into exhaust duct 30 of exhaust system 26. As is known in the art, a secondary combustion process can be carried out using augmentation system 34 within liner 32. The augmentation process elevates the speed and temperature of the mixed exhaust gas to further produce thrust using exhaust nozzle 36. Liner 32, which is suspended from exhaust duct 30 with hangers 12, prevents overheating of duct 30 from the secondary combustion process. Hangers 12 allow liner 32 to shift within exhaust duct 30 to accommodate different thermal expansion rates between liner 32 and duct 30, while accommodating different temperature gradients throughout exhaust system 26. Secondary air $A_S$ pressurizes the space between exhaust duct 30 and exhaust duct liner 32 to maintain, under normal operating conditions, hangers 12 in tension. However, under various operating conditions of engine 10 the pressure of secondary air $A_S$ can drop, causing liner 32 to move toward exhaust duct 30. Hangers 12 incorporate two-stage bumpers that react to both radial compressive and radial tensile loading between liner 32 and duct 30. The bumpers of hangers 12 are also configured to dampen vibration of liner 32.

Figure 2A:
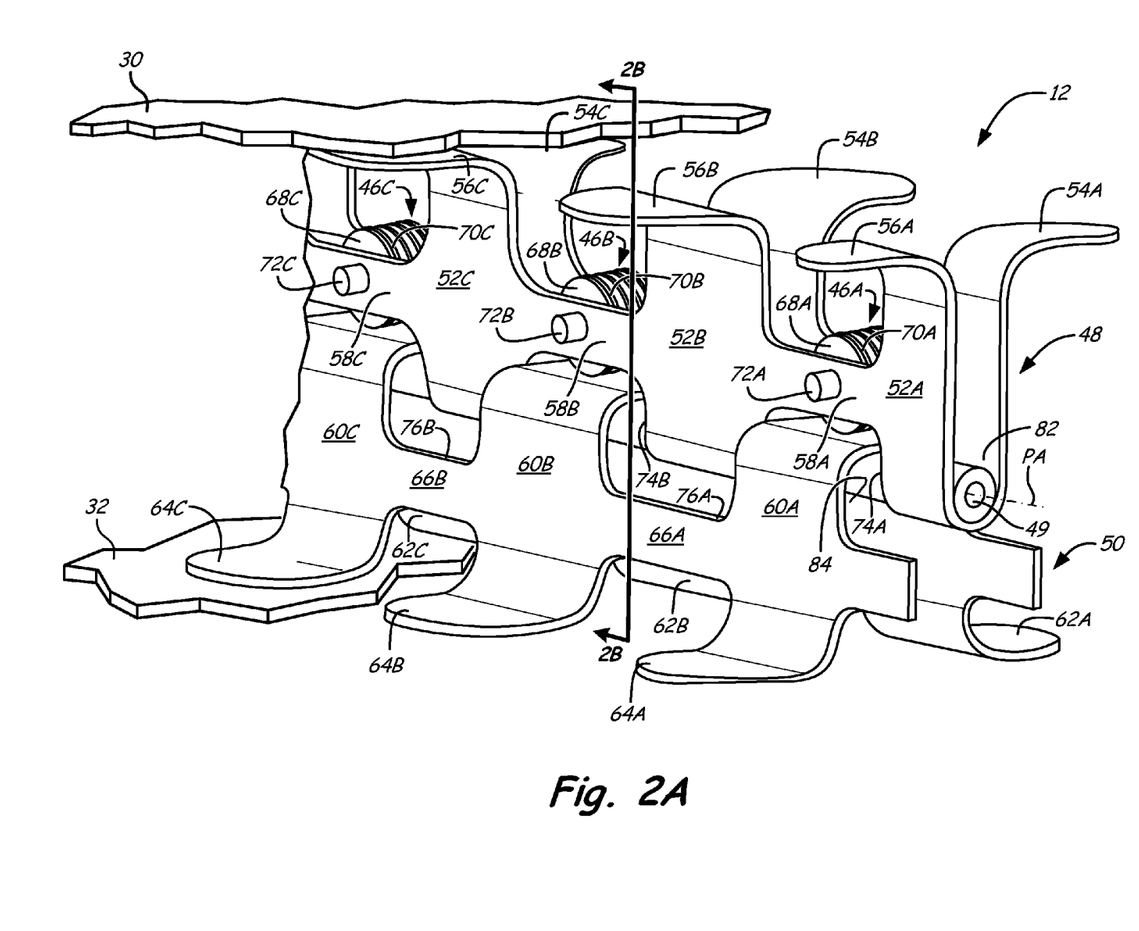
FIG. 2A is a perspective view of a first embodiment of an exhaust duct hanger including a two-stage bumper of the present invention being disposed between brackets of an exhaust duct and exhaust duct liner.

FIG. 2A is a perspective view of a first embodiment of exhaust duct hanger 12 including two-stage bumpers 46A-46C of the present invention being disposed between brackets 48 and 50 of exhaust duct 30 and exhaust duct liner 32, respectively. Bracket 48 is coupled to bracket 50 via pin 49, which extends along pin axis PA. Bracket 48 comprises straps 52A-52C, feet 54A-54C, feet 56A-56C and side rails 58A-58C. Bracket 50 comprises loops 60A-60C, feet 62A-62C, feet 64A-64C and side rails 66A-66B. Bumpers 46A-46C comprise bodies 68A-68C, ribs 70A-70C and rods 72A-72C, respectively.

FIG. 2A shows only a segment of bracket 48, which may extend in a repeating pattern of straps and side rails in any number. Similarly, bracket 50 may extend in a repeating pattern of loops and side rails in any number. For the purposes of this disclosure, the terms strap and loop are interchangeable, but strap is used with reference to bracket 48, while loop is used with reference to bracket 50 for clarity of the discussion.

Feet 54A-54C and feet 56A-56C of bracket 48 are coupled to exhaust duct 30 via any suitable methods. For example, feet 54A-54C and feet 56A-56C may be welded to exhaust duct 30, or may be coupled by fasteners. Feet 54A-54C and feet 56A-56C may therefore include bores, not shown, for coupling to exhaust duct 30. Similarly, feet 62A-62C and feet 64A-64C of bracket 50 are coupled to exhaust duct liner 32 via any suitable methods. For example, feet 62A-62C and feet 64A-64C may be welded to exhaust duct liner 32, or may be coupled by fasteners. Feet 62A-62C and feet 64A-64C may therefore include bores, not shown, for coupling to exhaust duct liner 32.

Bracket 50 is aligned along pin axis PA with bracket 48 such that loops 60A-60C are interspersed with straps 52A-52C. With reference to the orientation of FIG. 2A, which shows an upper portion of exhaust system 26 of FIG. 1, straps 52A-52C comprise right-side-up U-shaped bodies, and loops 60A-60C comprise upside-down U-shaped bodies. Straps 52A-52C and loops 60A-60C therefore have the opposite orientation on a lower portion of exhaust system 26 of FIG. 1. Although described as "U-shaped", straps 52A-52C and loops 60A-60C may have other shapes, such as V-shaped, and may be rounded or rectilinear. In any event, straps 52A-52C and loops 60A-60C form interior spaces 82 and 84, respectively, for receiving pin 49. Bracket 50 and exhaust duct liner 32 are therefore suspended from bracket 48 and exhaust duct 30 by pin 49.

Straps 52A-52C of bracket 48 are coupled by side rails 58A-58C on one side and opposing side rails (78, FIG. 2B) on the opposite side. The side rails join straps 52A-52C so as to form cut-outs for interfacing with bracket 50. For example, side rails 58A and 58B join straps 52A-52C to form cut-outs 74A and 74B. Loops 60A-60C of bracket 50 are coupled by side rails 66A-66C on one side and opposing side rails (80, FIG. 2B) on the opposite side. The side rails join loops 60A-60C so as to form cut-outs for interfacing with bracket 48. For example, side rails 60A and 60B join loops 60A-60C to form cut-outs 76A and 76B.

Straps 52B and 52C of bracket 48 are inserted into cut-outs 76A and 76B, respectively, within bracket 50. Loops 60A and 60B of bracket 50 are inserted into cut-outs 74A and 74B, respectively, within bracket 48. Straps 52A-52C and loops 60A-60C straddle opposite sides of pin 49 such that brackets 48 and 50 are rotatable relative to each other about pin axis PA. Thus, exhaust duct liner 32 can be suspended from exhaust duct 30.

Interaction of loops 60A-60C with cut-outs 74A and 74B limits axial movement of bracket 50 within exhaust duct 30. Thus, axial movement is limited to the size of any gap between loops 60A-60C and straps 52A-52C. Similarly, circumferential movement of liner 32 is limited by the width of straps 60A-60C. For example, the width of straps 52A-52C matches closely with the diameter of pin 49 such that pin 49 is circumferentially immobilized within straps 52A-52C. However, loops 60A-60C have a width that is larger than the diameter of pin 49 such that bracket 50 and exhaust duct liner 32 can move circumferentially commensurate with the width of loops 60A-60C (See FIG. 2B). The height or depth of cut-outs 74A, 74B, 76A and 76B also permit radial displacement between brackets 48 and 50. Specifically, bracket 50 can move radially outward until loops 60A and 60B impact side rails 52A and 52B, for example. Such clearances facilitate assembly of liner 32 to duct 30.

Assembled as such, with turbofan engine 10 (FIG. 1) not operating, bracket 50 and liner 32 are suspended from pin 49. Thus, the mechanical coupling of hanger 12 can react radial tensile loading between exhaust duct 30 and exhaust duct liner 32. However, the pressure between duct 30 and liner 32 during operation of turbofan engine 10, such as provided by secondary air $A_S$ (FIG. 1), can sometimes not be sufficient to react forces generated within liner 32. For example, operation of engine 10 may pass through a transient operating condition where the pressure of primary air $A_P$ in liner 32 exceeds the pressure of secondary air $A_S$ in duct 30. As such, liner 32 will be pushed toward duct 30. Thus, the interaction of bracket 48, pin 49 and bracket 50 as assembled does not provide reactive force against radial compressive loading. Bracket 50 will simply be pushed out toward bracket 50 until loops 60A-60C impact side rails 58A-58C when the pressure between duct 30 and liner 32 is overcome. This produces undesirable interaction between brackets 48 and 50, which lead to wear and potentially damage.

With the present invention, brackets 48 and 50 are provided with bumpers 46A-46C that provide reactive forces against radial compressive loading in hanger 12. Bumpers 46A-46C are configured as two-stage bumpers that provide a first level of resistance over a first portion of the radial displacement of liner 32 and a second level of resistance over a second portion of the radial displacement of liner 32.

In the embodiment shown, bumpers 46A-46C comprises cylindrical bodies extending between side rails of bracket 48, as is discussed in greater detail with reference to FIG. 2B.

Figure 2B:
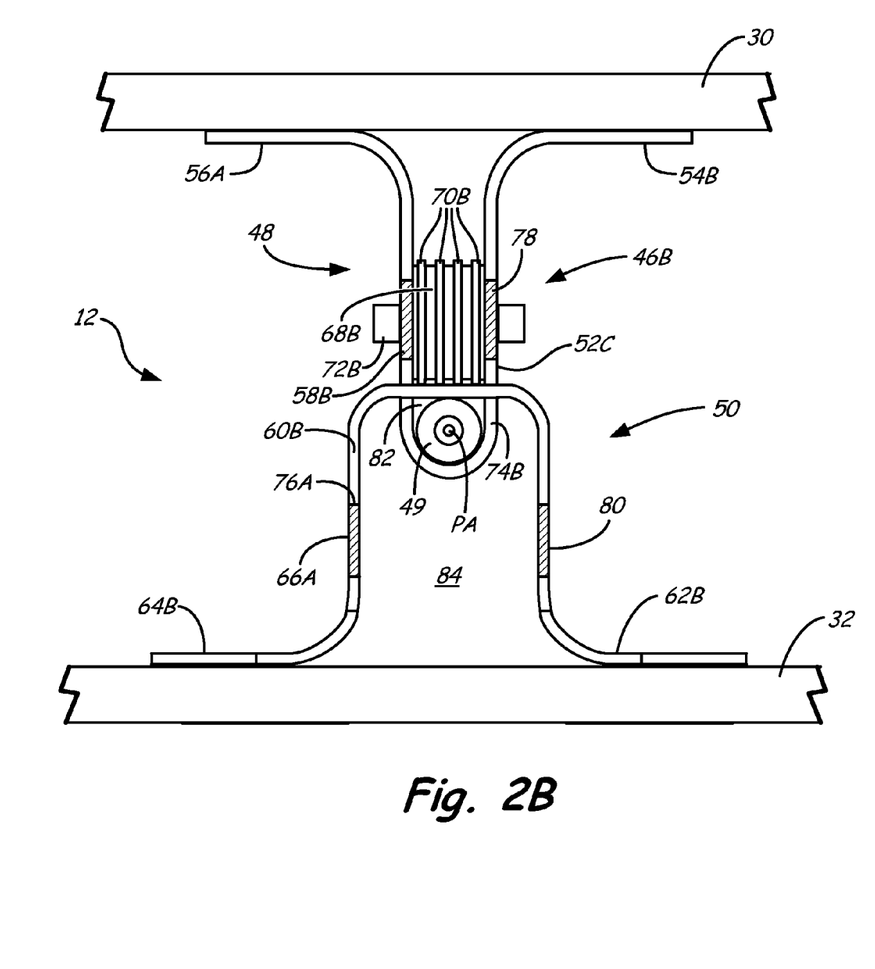
FIG. 2B is a side view of the hanger of FIG. 2A showing side rails to which the two-stage bumper is mounted.

FIG. 2B is a side view of brackets 48 and 50 taken as section 2B-2B of FIG. 2A showing two-stage bumper 46A mounted between side rails 58A and 78 of bracket 48. Bracket 48 includes strap 52C, feet 54B and 56B, side rail 58B, side rail 78 and cut-out 74B. Bracket 50 includes loop 60B, feet 62B and 64B, side rail 66A, side rail 80 and cut-out 76A. Bumper 64B includes body 68B, ribs 70B and post 72B.

As discussed above, bracket 48 and bracket 50 are respectively connected to exhaust duct 30 and exhaust duct liner 32 via any suitable means. Strap 52C of bracket 48 extends radially inward from exhaust duct 30 so as to have a right-side-up U-shape. Loop 60B of bracket 50 extends radially outward from exhaust duct liner 32 so as to have an upside-down U-shape. Such an orientation is described with reference to an upper portion of exhaust system 26 of FIG. 1, and such orientation would be reversed with reference to a lower portion of exhaust system 26.

Strap 52C extends radially inward to extend into cut-out 76A of bracket 50, while loop 60B extends radially outward to extend into cut-out 74B of bracket 48. As such, strap 52C and loop 60B straddle pin axis PA. Pin 49 is inserted into interior region 82 of strap 52C and interior region 84 of loop 60B so to extend along pin axis PA. In the position shown in FIG. 2B, bracket 48 and bracket 50 are at their furthest radially apart position such that pin 49 is fully seated in strap 52C and against loop 60B. Bumper 46B biases hanger 12 into a pre-tensioned position. Thus, exhaust duct 30 and exhaust duct liner 32 cannot move further away from each other.

Bumper 46B is coupled to the cold side of hanger 12 at bracket 48. As such, bracket 50 pushes into bumper 46B. However, bumper 46B can be joined to the hot side of hanger 12 at bracket 50. In the embodiment shown, bumper 46B is coupled to strap 52C so as to be engaged with loop 60B. Specifically, post 72B extends from side rail 58B to side rail 78. Body 68B of bumper 46B is disposed on post 72B and extends from side rail 58B to side rail 78. In one embodiment, post 72B extends through body 68B, but in other embodiments, body 68B may be provided with two post segments that are attached to the sides of body 68B. Body 68B is spaced from loop 60B. Ribs 70B extend from body 68B to engage loop 60B. Specifically, in the disclosed embodiment, ribs 70B comprise circumferential flanges that circumscribe body 68B. As such, ribs 70B and body 68B are positioned to react radial compressive loading between exhaust duct 30 and exhaust duct liner 32. Bumper 46B does not prevent all movement of bracket 50 toward bracket 48, but rather inhibits movement. Specifically, movement of bracket 50 is slowed to provide system damping.

In the disclosed embodiment, bumper 46B is configured as a two-stage damper, wherein ribs 70B provide a first degree of damping and body 68B provides a second degree of damping. In one embodiment, ribs 70B provide less damping than body 68B. It is desirable to have first-stage damping that is relatively easy to deform compared to the second-stage damping for assembly purposes. Specifically, it is desirable to be able to easily manually displace bracket 50 radially to assembly exhaust duct liner 32 to exhaust duct 30. The second-stage damping can then be stiffer for reacting compressive loading during operation of engine 10. Thus, radial outward displacement of liner 32 first compresses ribs 70B, which may already be compressed when exhaust system 26 is assembled. After ribs 70B are completely compressed, body 68B will deform until loop 60B contacts side rails 58B and 78, which act as a hard stop to prevent any further radially outward displacement of bracket 50.

In one embodiment, bumper 46B is formed of a viscoelastic material, as are known in the art. Viscoelastic materials exhibit both viscous and elastic behavior; that is, viscoelastic materials resist strain when stressed over time (are viscous), but return to their original shape when not stressed (are elastic). Viscoelastic materials are thereby capable of absorbing vibration energy and providing damping. In one embodiment, bumper 46B is comprised of silicone. In other embodiments, bumper 46B is comprised of any suitable viscoelastic polymer. In yet other embodiments, bumpers of the present invention can be comprised of any deformable, resilient material that absorbs energy, such as rubber.

In addition to the material properties of bumper 46B, the geometry or shape of bumper 46B can be selected to affect the damping provided by bumper 64B. Body 68B has a height and cross-sectional area that is sufficient, based on its material, to react operational loading from bracket 50. Ribs 70B have a total cross-sectional area that is smaller than that of body 68B. Ribs 70B are also shorter than body 68B. Thus, ribs 70B provide less damping, which facilitates displacement of liner 32 during assembly of exhaust system 26.

Ribs 70B and body 68B need not be comprised of the same material. For example, in one embodiment, ribs 70B and body 68B comprise a unitary body formed of the same material. Ribs 70B thus provide less resistance to compressive loading than body 68B based only on geometry. In other embodiments, ribs 70B and body 68B can be formed of different materials. Thus, the amount of damping provided by ribs 70B and 68B can be controlled by changing the cross-sectional area and material of each portion of bumper 68B. As such, the shape or geometry and the material of body 68B and ribs 70B, along with the total number of bumpers used, can be selected to provide liner 32 with a desired amount of damping for conditions of operation in engine 10.

Figure 3A:
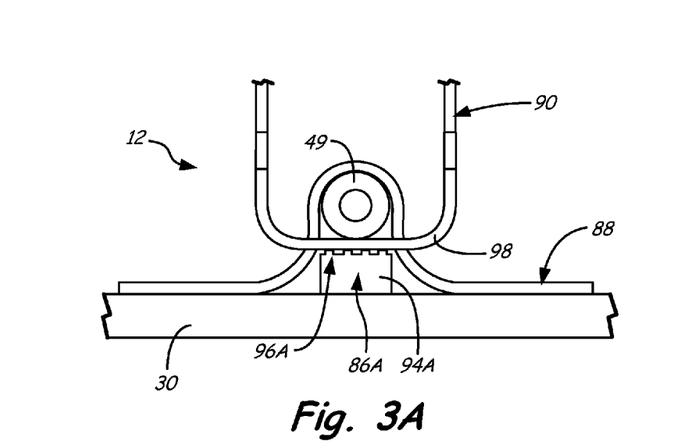
FIG. 3A is a side view of a second embodiment of an exhaust duct hanger including a two-stage bumper of the present invention being disposed between an exhaust duct liner bracket and an exhaust duct.
Figure 3B:
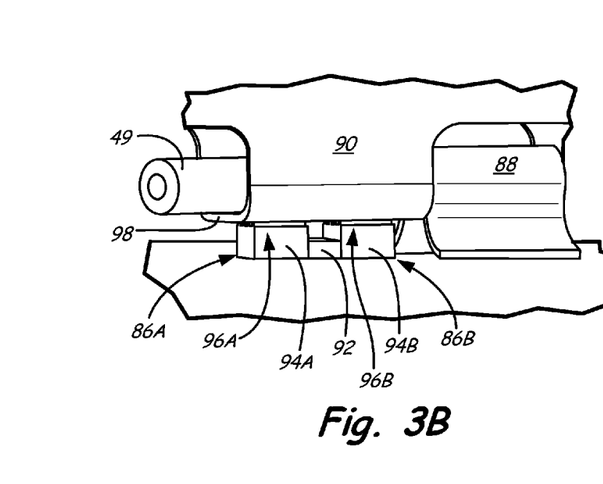
FIG. 3B is a close-up perspective view of the two-stage bumper of FIG. 3A showing a hard stop positioned between two-stage bumpers.

FIG. 3A is a side view of a second embodiment of exhaust duct hanger 12 including two-stage bumper 86A of the present invention used in conjunction with brackets 88 and 90. FIG. 3B is a close-up perspective view of bumper 86A of FIG. 3A and bumper 86B showing block 92 positioned between adjacent bodies 94A and 94B. Bodies 94A and 94B each include a plurality of ribs 96A and 96B, respectively. FIGS. 3A and 3B are discussed concurrently.

Bracket 88 is coupled to exhaust duct 30 and bracket 90 connects to an exhaust duct liner (not shown). Bracket 90 is the same as bracket 50 of FIGS. 2A and 2B. Bracket 88 is similar to bracket 48 of FIGS. 2A and 2B, except that that bracket 88 does not have side rails and is, therefore, shorter in height than bracket 48. Thus, bracket 88 can be used in low-profile exhaust systems. Loop 98 is positioned in close proximity to exhaust duct 30. Bumpers 86A and 86B are positioned between exhaust duct 30 and bracket 90 to provide first and second rates of damping to bracket 90. Block 92 is positioned between bumpers 86A and 86B to ultimately provide a hard stop before bracket 90 impacts duct 30. In the depicted embodiment, two-stage bumpers 86A and 86B are attached to exhaust duct 30. Two-stage bumpers 86A and 86B can, however, be attached to loop 98 of bracket 90 in other embodiments. Each of the pairing of body 94A and ribs 96A, and the pairing of body 94B and rib 94B performs similarly to that of body 68B and ribs 70B of damper 46B in FIG. 2B.

Two-stage bumpers 86A and 86B are positioned on exhaust duct 30 so as to engage loop 98 when bracket 90 is in its furthest position from duct 30, as depicted in FIG. 3A. As such, bumpers 86A and 86B bias hanger 12 in a pre-tensioned position. Pin 49 absorbs radial tensile loading of hanger 12 between brackets 88 and 90. However, if pressure within liner 32 (not shown) pushes liner 32 toward duct 30, bumpers 86A and 86B will react the radial compressive loading in hanger 12. Specifically, ribs 96A and 96B will provide a first degree of damping based the material properties of ribs 96A and 96B and the total cross-sectional area of ribs 96A and 96B that engage loop 98. After ribs 96A and 96B become fully compressed, bodies 94A and 94B will provide a second degree of damping based on their material properties and cross-sectional areas. Body 94A and ribs 96A may be of the same or different material. Likewise, body 94B and ribs 96B may be of the same or different material. Additionally, bumpers 86A and 86B need not be comprised of the same material or materials. After bodies 94A and 94B become fully deformed, loop 98 will contact block 92. Block 92 comprises a body of rigid material that is capable of substantially or completely arresting further movement of bracket 90, thereby stopping further compressive loading in hanger 12. In one embodiment, block 92 is comprised of a metallic material. For example, block 92 can be comprised of the same material as bracket 90 so as to minimize wear between the two bodies.

Bumpers of the present invention provide pre-tensioning of hangers used to mount exhaust duct liners within exhaust ducts. The pre-tensioning reduces vibration within the exhaust system. The bumpers are also deformable to allow for displacement of the liner during operation of the engine. The deformability of the bumpers further provides damping of vibration that may be generated during operation, thereby preventing vibration at resonance frequencies. The bumpers are also resilient so that they return the exhaust duct liner to its original, installed position after the vibration has ceased or a transient engine operation condition has ceased. Specifically, during operation of turbofan engine 10 (FIG. 1), various temperature gradients within exhaust system 26 (FIG. 1), produce local stresses and strains within liner 32. Liner 32 is thereby subject to local distortions and displacements. Pin 49 and bumpers 46 and 86 react radial tensile and compressive loading in hanger 12. Bumpers 46 and 86 of the present invention prevent undamped radially compressive loading in hanger 12. The damping can be tuned by altering the geometric features and the material properties of the bumpers to produce a unique load/displacement curve optimized for intended applications.

Bumpers 46 and 86 of the present invention are easily installed in existing hanger systems and designs. For example, bumpers 46 can be attached to existing brackets and bumpers 86 can be attached to existing ducts. Further, side rails can be added to loops or straps of existing bracket designs without having to completely redesign the bracket. Additionally, bumpers of the present invention can be made of commonly used materials that are inexpensive.

The following are non-exclusive descriptions of possible embodiments of the present invention.

A hanger for use in a gas turbine engine exhaust system comprises: a first bracket for connecting to the gas turbine exhaust system; a second bracket for connecting to the gas turbine exhaust system; a pin extending through the first and second brackets to bring the first and second brackets into pivotable engagement; and a bumper positioned adjacent the first or second bracket to inhibit movement of the first bracket relative to the second bracket.

The hanger of the preceding paragraph can optionally include, additionally and/or alternatively, any one or more of the following features, configurations and/or additional components:

A hanger wherein the bumper comprises: a viscoelastic body; and a viscoelastic rib extending from the body.

A hanger wherein: the body provides a first damping rate; and the rib provides a second damping rate less than the first damping rate.

A hanger wherein: the first bracket comprises first and second straps; and the second bracket comprises a first loop; wherein the pin extends through the first and second straps and the first loop.

A hanger wherein the bumper is coupled to the first bracket and limits movement of the second bracket.

A hanger wherein the first bracket further comprises: first and second side rails extending between the first and second straps; wherein the first loop is positioned between the first and second straps; and wherein the bumper extends between the first and second side rails to contact the first loop.

A hanger wherein the bumper comprises a post extending through the bumper and the first and second side rails.

A hanger wherein the bumper comprises: a cylindrical body coupled to the first bracket and having a circumferential side surface facing toward the second bracket; and a plurality of flanges extending from the circumferential side surface.

A hanger wherein the bumper comprises: a block positioned adjacent the second bracket; and a plurality of ribs extending from the block.

A hanger wherein the bumper further comprises: a rigid body positioned adjacent the block, the rigid body having a height less than that of the block.

A suspension system comprising: an exhaust duct of a gas turbine engine; an exhaust duct liner disposed within the exhaust duct; a pin extending along a pin axis between the exhaust duct and the exhaust duct liner; a first bracket connected to the exhaust duct, the first bracket comprising: a first strap through which the pin extends; a second strap through which the pin extends; and first and second side rails connecting the first and second straps; a second bracket connected to the exhaust duct liner, the second bracket comprising: a first loop through which the pin extends, the first loop being positioned between the first and second straps; and a bumper positioned between the first loop and the exhaust duct.

The suspension system of the preceding paragraph can optionally include, additionally and/or alternatively, any one or more of the following features, configurations and/or additional components:

A suspension system wherein the bumper is comprised of a viscoelastic material.

A suspension system wherein the bumper is a two-stage bumper.

A suspension system wherein the bumper comprises: a cylindrical body extending between the first and second side rails; and a plurality of circumferential flanges extending from the cylindrical body.

A suspension system wherein the bumper further comprises a post extending through the bumper and the first and second side rails.

A suspension system wherein the bumper comprises: a block positioned between the exhaust duct and the first loop; and a plurality of ribs extending from the block towards the first loop.

A suspension system further comprising: a rigid body positioned adjacent the block, the rigid body having a height less than that of the block.

An exhaust duct liner suspension system comprises: a first bracket having a first strap; a second bracket having a first loop positioned adjacent the first strap such that the second bracket is radially displaceable relative to the first bracket; a pin extending through the first strap and the first loop such that the first bracket and second bracket are circumferentially rotatable relative to each other, wherein the pin limits radial tensile loading between the first and second brackets; and a bumper positioned adjacent the second bracket to dampen radial compressive loading between the first and second brackets.

The exhaust duct liner suspension system of the preceding paragraph can optionally include, additionally and/or alternatively, any one or more of the following features, configurations and/or additional components:

An exhaust liner suspension system wherein: the first bracket comprises a cut-out partially formed by the first strap; and the bumper comprises: a post extending across the first cut-out; a cylindrical body mounted to the post; and a plurality of ribs extending from the cylindrical body to engage the first loop.

An exhaust liner suspension system wherein the bumper comprises: a body positioned adjacent the second bracket; a plurality of ribs extending from the body to engage the first loop; and a rigid block positioned adjacent the body, the rigid block having a height less than that of the body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hanger for use in a gas turbine engine exhaust system, the hanger comprising:
   a first bracket for connecting to the gas turbine exhaust system, the first bracket comprising:
      a first strap;
      a second strap; and
      first and second side rails extending between the first and second straps;
   a second bracket for connecting to the gas turbine exhaust system, the second bracket comprising:
      a first loop disposed between the first and second straps;
   a pin extending through the first strap, the second strap, and the first loop to bring the first and second brackets into pivotable engagement; and
   a bumper positioned adjacent the first or second bracket to inhibit movement of the first bracket relative to the second bracket, wherein the bumper comprises a post extending through the bumper and the first and second side rails to couple the bumper to the first bracket, and wherein the bumper extends between the first and second siderails to contact the first loop, thereby limiting the movement of the second bracket.

2. The hanger of claim 1 wherein the bumper comprises:
   a viscoelastic body; and
   a viscoelastic rib extending from the body.

3. The hanger of claim 2 wherein:
   the body provides a first damping rate; and
   the rib provides a second damping rate less than the first damping rate.

4. The hanger of claim 1 wherein the bumper comprises:
   a cylindrical body coupled to the first bracket and having a circumferential side surface facing toward the second bracket; and
   a plurality of flanges extending from the circumferential side surface.

5. The hanger of claim 1 wherein the bumper comprises:
   a block positioned adjacent the second bracket; and
   a plurality of ribs extending from the block.

6. The hanger of claim 5 wherein the bumper further comprises:
   a rigid body positioned adjacent the block, the rigid body having a height less than that of the block.

7. A suspension system comprising:
   an exhaust duct of a gas turbine engine;
   an exhaust duct liner disposed within the exhaust duct;
   a pin extending along a pin axis between the exhaust duct and the exhaust duct liner;
   a first bracket connected to the exhaust duct, the first bracket comprising:
      a first strap through which the pin extends;
      a second strap through which the pin extends; and
      first and second side rails connecting the first and second straps;
   a second bracket connected to the exhaust duct liner, the second bracket comprising:
      a first loop through which the pin extends, the first loop being positioned between the first and second straps, wherein the pin restrains relative displacement of the first bracket away from the second bracket and does not restrain relative displacement of the first bracket towards the second bracket; and
   a bumper positioned between the first loop and the exhaust duct and engaging a radially-facing end of the first loop, wherein the bumper restrains relative displacement of the first bracket towards the second bracket and does not restrain relative displacement of the first bracket away from the second bracket.

8. The suspension system of claim 7 wherein the bumper is comprised of a viscoelastic material.

9. The suspension system of claim 7 wherein the bumper is a two-stage bumper.

10. The suspension system of claim 7 wherein the bumper comprises:
    a cylindrical body extending between the first and second side rails; and
    a plurality of circumferential flanges extending from the cylindrical body.

11. The suspension system of claim 10 wherein the bumper further comprises a post extending through the bumper and the first and second side rails.

12. The suspension system of claim 7 wherein the bumper comprises:
    a block positioned between the exhaust duct and the radially-facing end of the first loop; and
    a plurality of ribs extending from the block towards the first loop.

13. The suspension system of claim 12 and further comprising:
    a rigid body positioned adjacent the block, the rigid body having a height less than that of the block.

14. An exhaust duct liner suspension system comprising:
    a first bracket having a first strap;
    a second bracket having a first loop positioned adjacent the first strap such that the second bracket is radially displaceable relative to the first bracket;
    a pin extending through the first strap and the first loop such that the first bracket and second bracket are circumferentially rotatable relative to each other, wherein the pin limits radial tensile loading between the first and second brackets wherein the pin restrains relative displacement of the first bracket away from the second bracket and does not restrain relative displacement of the first bracket towards the second bracket; and a bumper engaging a radially-facing end of the first loop to dampen radial compressive loading between the first and second brackets, wherein the bumper restrains relative displacement of the first bracket towards the second bracket and does not restrain relative displacement of the first bracket away from the second bracket.

15. The exhaust liner suspension system of claim 14 wherein:
the first bracket comprises a cut-out partially formed by the first strap; and
the bumper comprises:
a post extending across the first cut-out;
a cylindrical body mounted to the post; and
a plurality of ribs extending from the cylindrical body to engage the first loop.

16. The exhaust liner suspension system of claim 14 wherein the bumper comprises:
a body positioned adjacent the second bracket;
a plurality of ribs extending from the body to engage the first loop; and
a rigid block positioned adjacent the body, the rigid block having a height less than that of the body.

17. The suspension system of claim 13, wherein relative radial displacement of the first loop towards the exhaust duct is restrained by the block until the radially-facing end of the first loop engages the rigid body and thereby preventing further radial displacement of the first loop relative to and towards the exhaust duct.

18. The suspension system of claim 7, wherein the first strap, the second strap, and the first loop are generally U-shaped, each having an open end and a closed end opposite the open end, and wherein relative displacement of the first bracket away from the second bracket is restrained by the pin engaging the closed ends of the first strap, the second strap, and the first loop, and wherein relative displacement of the first bracket towards the second bracket disengages the pin and further engages the bumper with the radially-facing end of the first loop.

* * * * *